United States Patent [19]

Yoshikawa et al.

[11] Patent Number: 5,479,292

[45] Date of Patent: Dec. 26, 1995

[54] INFRARED WIDE-ANGLE SINGLE LENS FOR USE IN AN INFRARED OPTICAL SYSTEM

[75] Inventors: Motonobu Yoshikawa, Osaka; Yoshiharu Yamamoto, Toyonaka, both of Japan

[73] Assignee: Matsushita Electric Industrial Co., Ltd., Osaka, Japan

[21] Appl. No.: 118,233

[22] Filed: Sep. 9, 1993

[30] Foreign Application Priority Data

Sep. 10, 1992 [JP] Japan ................................ 4-241601

[51] Int. Cl.$^6$ .............................. G02B 13/14; G01J 5/00
[52] U.S. Cl. ......................... 359/355; 250/353; 359/356
[58] Field of Search ................................. 359/350, 355, 359/356, 357; 250/338.1, 338.3, 351, 353

[56] References Cited

U.S. PATENT DOCUMENTS

| | | | |
|---|---|---|---|
| 4,087,688 | 5/1978 | Keller | 359/356 |
| 4,321,594 | 3/1982 | Galvin et al. | 359/356 |
| 4,322,124 | 3/1982 | Padgitt et al. | |
| 4,494,819 | 1/1985 | Lidwell | |
| 4,507,551 | 3/1985 | Howard et al. | |
| 4,535,240 | 8/1985 | Vigurs | 359/356 |
| 4,632,563 | 12/1986 | Lord, III | |
| 4,717,821 | 1/1988 | Messiou | |
| 4,802,717 | 2/1989 | Kebo | |
| 4,986,642 | 1/1991 | Yokota et al. | |
| 5,022,725 | 6/1991 | Matsunami et al. | 359/356 |
| 5,111,325 | 5/1992 | DeJager | |
| 5,151,820 | 9/1992 | Sillitto et al. | |
| 5,202,792 | 4/1993 | Rollin | 359/357 |
| 5,214,532 | 5/1993 | Hall et al. | 359/357 |
| 5,315,434 | 5/1994 | Mizuno et al. | 359/356 |

FOREIGN PATENT DOCUMENTS

| | | |
|---|---|---|
| 1496458 | 8/1967 | France . |
| 1903223 | 7/1970 | Germany . |
| 52-37444 | 3/1977 | Japan . |
| 53-41279 | 4/1978 | Japan . |
| 61-122602 | 6/1986 | Japan . |
| 3-44612 | 2/1991 | Japan . |
| 88/03658 | 5/1988 | WIPO . |

*Primary Examiner*—Martin Lerner
*Attorney, Agent, or Firm*—Wenderoth, Lind & Ponack

[57] ABSTRACT

In an infrared wide-angle single lens which is as constructed as of a positive meniscus lens, the following conditional expressions (1) through (6) are satisfied:

(1) $-50.0\ th < r_1 < -3.5\ th$ (2) $-5\ th < r_2 < -1.1\ th$ (3) $2 < n < 4.5$ (4) $0.1\ f < d < 0.8\ f$ (5) $0.5\ f < bf < 1.5\ f$ (6) $0.5\ f < th < 2f$ where, an aperture stop is disposed between an object plane and a first surface, d is the distance between the aperture stop and the first surface, th is the lens thickness, bf is the backfocus, $r_1$ is the radius of curvature of the first surface of the lens, $r_2$ is the radius of curvature of a second surface of the lens, n is the refractive index of a vitric material of the lens at a wavelength of 10 μm, and f is the focal length.

16 Claims, 5 Drawing Sheets

— S.A.
--- S.C.

-0.5  0.0  0.5
SPHERICAL
ABERRATION (MM)
SINE
CONDITION

— MERIDIONAL
--- SAGITTAL 0.5  0.0  0.5
ASTIGMATISM (MM)

-20.0  0.0  20.0
DISTORTION (%)

Fig. 4(d-1)
1.000 FA
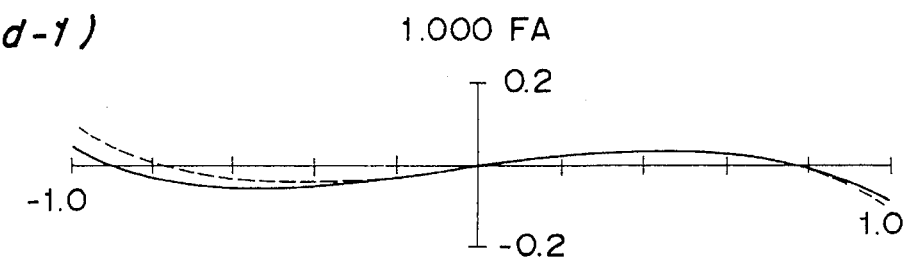
Fig. 4(d-2)
0.900 FA
Fig. 4(d-3)
0.700 FA
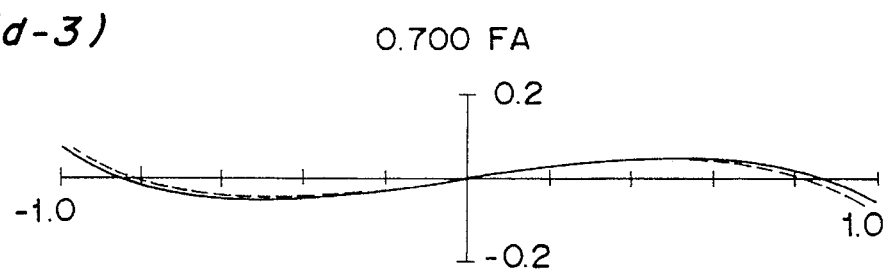
Fig. 4(d-4)
0.500 FA
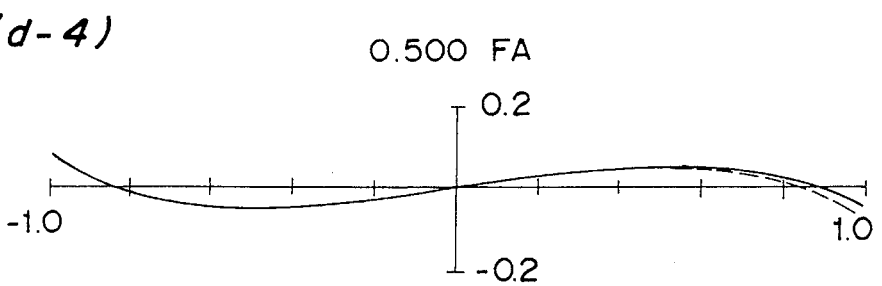
Fig. 4(d-5)
ON AXIS
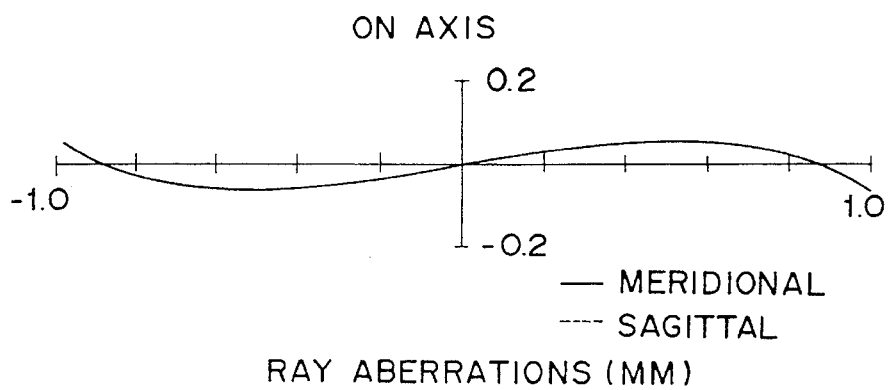
—— MERIDIONAL
---- SAGITTAL
RAY ABERRATIONS (MM)

INFRARED WIDE-ANGLE SINGLE LENS FOR USE IN AN INFRARED OPTICAL SYSTEM

BACKGROUND OF THE INVENTION

1. Field of the Invention

The present invention relates to an infrared wide-angle single lens for use in an infrared optical system, which is employed in a non-contact type temperature measuring device serving primarily for detection of temperature conditions in a room and the like.

2. Description of the Prior Art

In a conventional non-contact type temperature measuring device, there has been used an inexpensive single-element infrared-ray detector. In such an infrared detector, a thermal image of infrared rays is formed on an infrared detector through an infrared optical system having a narrow angle of view. Therefore, when a temperature is measured over a wide range of a thermal object, a scanning operation is effected to measure temperatures of individual ranges. However, such infrared detectors have been so complicated in construction in all cases that it is difficult to reduce the size and price of the device, disadvantageously.

With the arrangement of the infrared detector as mentioned above, the detector is be set with a problem that two-dimensional scanning is necessitated, which leads to difficulties in reducing the size and price of the device.

In recent years, research and studies have been conducted upon inexpensive arrayed or two-dimensional infrared detectors. As a result, there is a desire to make an infrared wide-angle lens for use in an infrared optical system capable of forming an image of an object in a wide range at a time on the detector and yet capable of making the system small in size and low in price.

SUMMARY OF THE INVENTION

Accordingly, an essential objective of the present invention is to provide an infrared wide-angle single lens which meets the requirements of optical performance that an MTF (Modulation Transfer Function) is 50% or more (5 lp/mm) and that a peripheral light-quantity ratio is 85% or more over an entire range of a half angle of view of 35 degrees, despite being a single lens.

In order to achieve the above objective, the present invention provides an infrared wide-angle single lens which is in the form of a positive meniscus lens having a first surface made concave facing toward an object as an infrared source and a second surface made convex facing toward an imaging plane of the lens. The infrared wide-angle single lens satisfying the following formula expressions (1) through (6) under the condition that an aperture stop is disposed between the object plane and the first surface of the lens:

(1) $-50.0 \text{ th} < r_1 < -3.5 \text{ th}$ (2) $-5 \text{ th} < r_2 < -1.1 \text{ th}$ (3) $2 < n < 4.5$ (4) $0.1 \text{ f} < d < 0.8 \text{ f}$ (5) $0.5 \text{ f} < bf < 1.5 \text{ f}$ (6) $0.5 \text{ f} < th < 2f$ where d is the distance between the aperture stop and the first surface, th is the lens thickness, bf is the backfocus amount between the second surface and the Gaussian image plane ($I_G$), $r_1$ is the radius of curvature of the first surface, $r_2$ is the radius of curvature of the second surface, n is the refractive index of a vitric material of the lens at a wavelength of 10 μm, and f is the focal length.

The expressions (1), (2), and (3) show conditions needed to obtain a necessary angle of view, an image height, and optical characteristics such as MTF and peripheral light-quantity ratio. Further, satisfaction of the condition (4) prevents comatic aberration from occurring at the second surface, which enables the lens to obtain better optical characteristics.

Also, when the lower limit of the condition (5) is met, assembly adjustment with an infrared detector is facilitated. Similarly, when the upper limit of the condition (5) is met, the entire optical system can be reduced in size.

Furthermore, when the lower limit of the condition (6) is met, the edge thickness of the lens becomes greater, facilitating the machining process of the lens. Similarly, when the upper limit thereof is met, the influence of infrared absorption by the vitric material is reduced, allowing a sufficient quantity of light to be obtained.

Moreover, use of the infrared wide-angle single lens and an infrared detector in combination provides a non-contact temperature measuring device which is made small in size and low in price.

Still further, use of the non-contact temperature measuring device of the present invention allows realization of an air conditioner system made small in size and low in cost which can offer optimum air-conditioning by using measurement results from detecting the position of a human body and measuring the temperatures of individual ranges in a room, without degrading the appearance of the air conditioner system.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

The following describes embodiments of the present invention with reference to the accompanying drawings.

Figure 1:
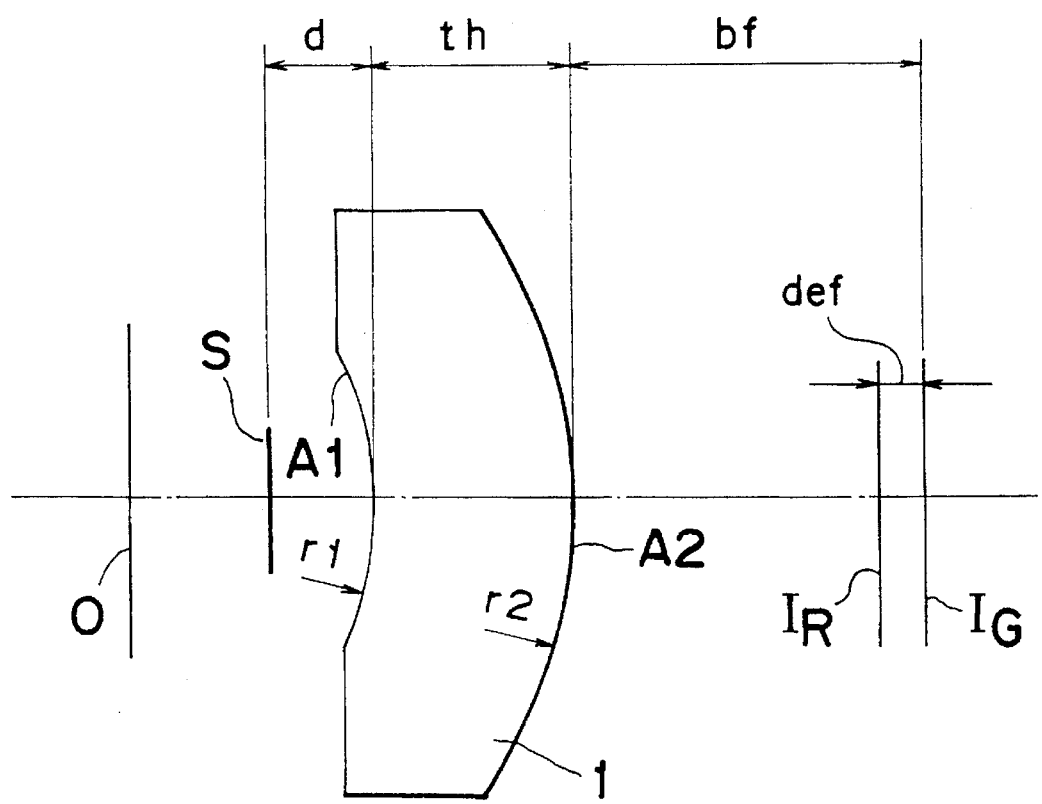
FIG. 1 is a schematic view showing a configuration of an infrared wide-angle single lens according to the present invention.

FIG. 1 shows a configuration of an infrared wide-angle single lens according to an embodiment of the present invention. The infrared wide-angle single lens 1 is configured as a positive meniscus lens having a first surface A1 made concave facing toward an object plane O as an infrared light source and a second surface A2 made convex facing toward an imaging plane of the lens. An aperture stop S is disposed between the object plane O and the first surface A1.

Examples 1 through 4 of the infrared wide-angle single lens are shown with concrete physical numeric values listed in Tables 1 through 4 respectively under the condition that silicon is used as a vitric material of the lens. It is to be noted here that other materials than silicon may be used as a vitric material of the lens so long as the condition (3) is satisfied.

In Tables 1 through 4, reference character d denotes the distance between the aperture stop S and the first surface A1 on the axis; th denotes the lens thickness; bf denotes the backfocus representing the distance between the second surface and the Gaussian image plane $I_G$; $r_1$ denotes the radius of curvature of the first surface; $r_2$ denotes the radius of curvature of the second surface A2; n denotes the refractive index of the vitric material of the lens at a wavelength of 10 μm; f denotes the focal length; def denotes the defocusing amount representing the distance between the proximate-axis image forming position (the Gaussian image plane $I_G$) and the real image plane $I_R$ as shown in FIG. 1; F denotes the F number; and w denotes the half angle of view.

The first through fourth Examples of the infrared wide-angle single lens of the present invention constructed as shown in Tables 1 through 4 meet the optical performance requirements that the MTF of the lens is 50% or more (5 lp/mm) and that a peripheral light-quantity ratio is 85% or more over the entire range of a half angle of view of 35 degrees, despite being a single lens. Aberration views of, e.g., the first Example shown in Table 1 are given in FIGS. 4(a) through 4(c) and 4(d-1) through 4(d-5).

Figure 4A:
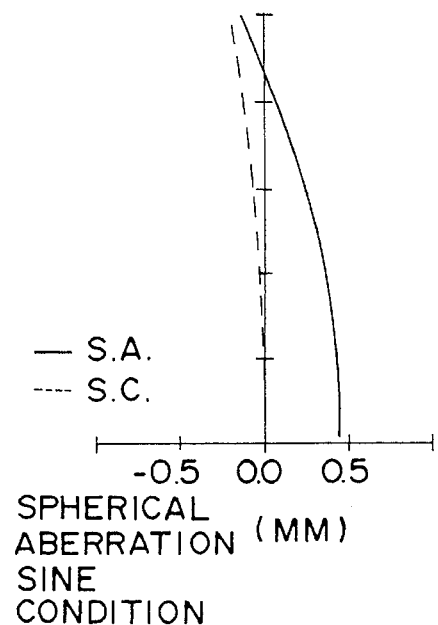
FIGS. 4 (a), (b), (c), (d-1), (d-2), (d-3), (d-4) and (d-5) are graphs showing aberration views of the infrared wide-angle single lens of the present invention.
Figure 4B:
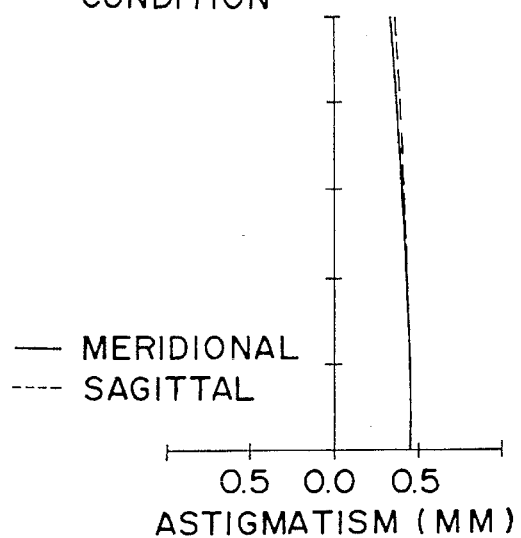
Figure 4C:
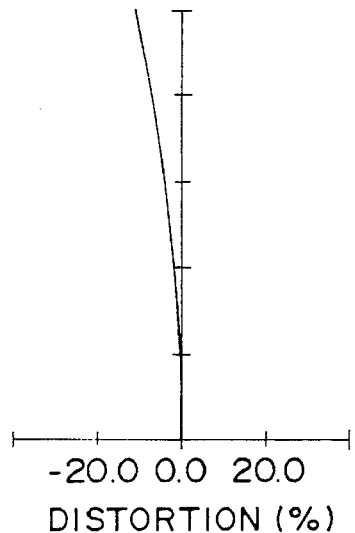

In the first Example, FIG. 4(a) shows a spherical aberration (mm) indicated by a solid line and a sine condition indicated by a broken line where the horizontal axis represents the spherical aberration and the vertical axis represents the height of light rays; FIG. 4(b) shows an astigmatism (mm) of the lens where a solid line indicates the case of meridional rays and a broken line indicates the case of sagittal rays; and FIG. 4(c) shows a distortion aberration (%). FIGS. 4(d-1) through 4(d-5) show ray aberrations (mm) of the lens, where solid lines indicate the case of meridional rays and broken lines indicate the case of sagittal rays, where the horizontal axis represents the height of light rays and FA denotes a field angle.

Similarly, the second through fourth Examples shown in Tables 2 through 4 also satisfy the requirements of optical performance as mentioned before.

Figure 2:
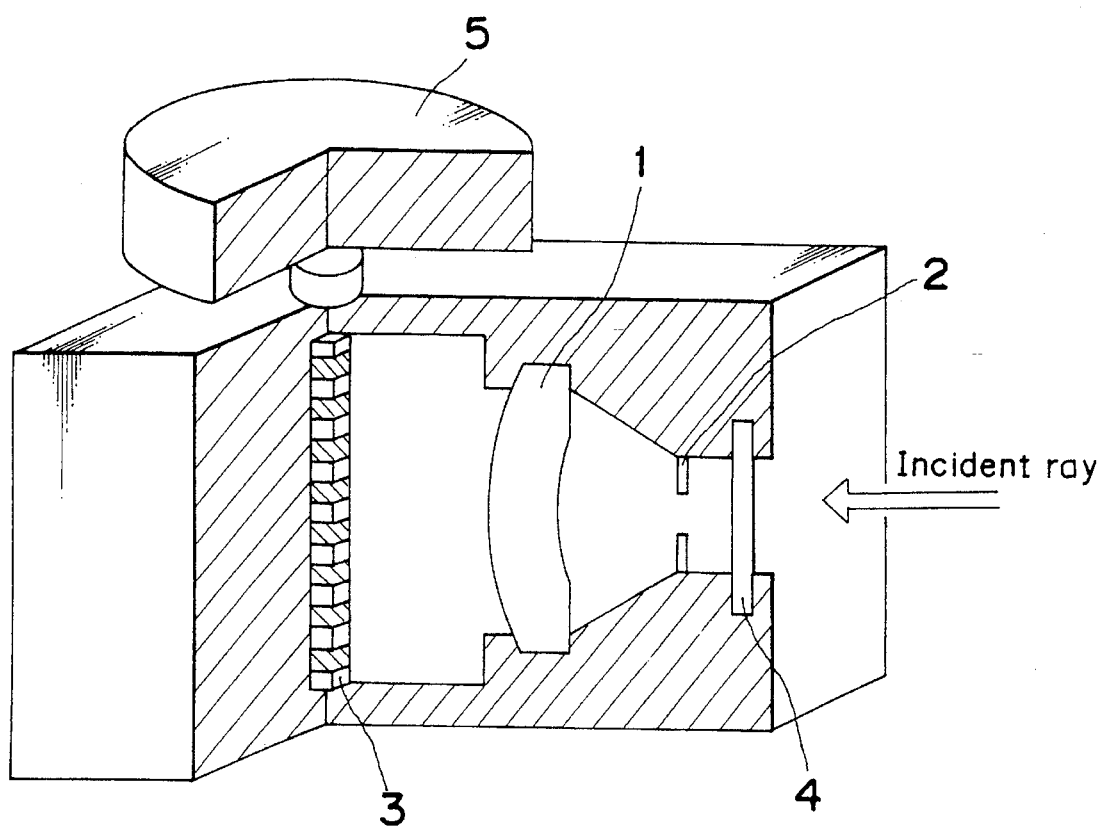
FIG. 2 is a schematic view of a non-contact temperature measuring device according to the present invention.

FIG. 2 shows an arrangement of a non-contact temperature measuring device when the infrared wide-angle single lens of the present embodiment is used therein. In FIG. 2, reference numeral 1 denotes an infrared wide-angle single lens of the present invention; 2 denotes an aperture stop; 3 denotes a pyroelectric infrared detector arranged longitudinally (vertically in the figure) to form an eight-element array; 4 denotes a chopper for intermittently shielding an infrared ray; and 5 denotes a motor for rotating the entire unit for scanning an object in the lateral direction.

Referring next to the operation of the non-contact temperature measuring device of FIG. 2, the incident infrared ray emitted from an object is intermittently shielded by the chopper 4 and passed through the aperture stop 2, and an image of the object is formed on the pyroelectric infrared detector 3 through the infrared wide-angle single lens 1, whereby one-dimensional infrared images of longitudinally 8-divided ranges are detected. Further, by scanning in the lateral (horizontal in the figure) direction by operation of the motor 5, two-dimensional infrared images are detected. It is also possible to detect a position of a human body from variations in measured temperatures of the individual ranges.

In this way, according to the present embodiment, using an infrared detector in combination with an infrared wide-angle single lens of the present embodiment, it becomes possible to measure temperatures of the individual measurement ranges, which allows for the realization of a small-sized, low-priced non-contact temperature measuring device.

Figure 3:
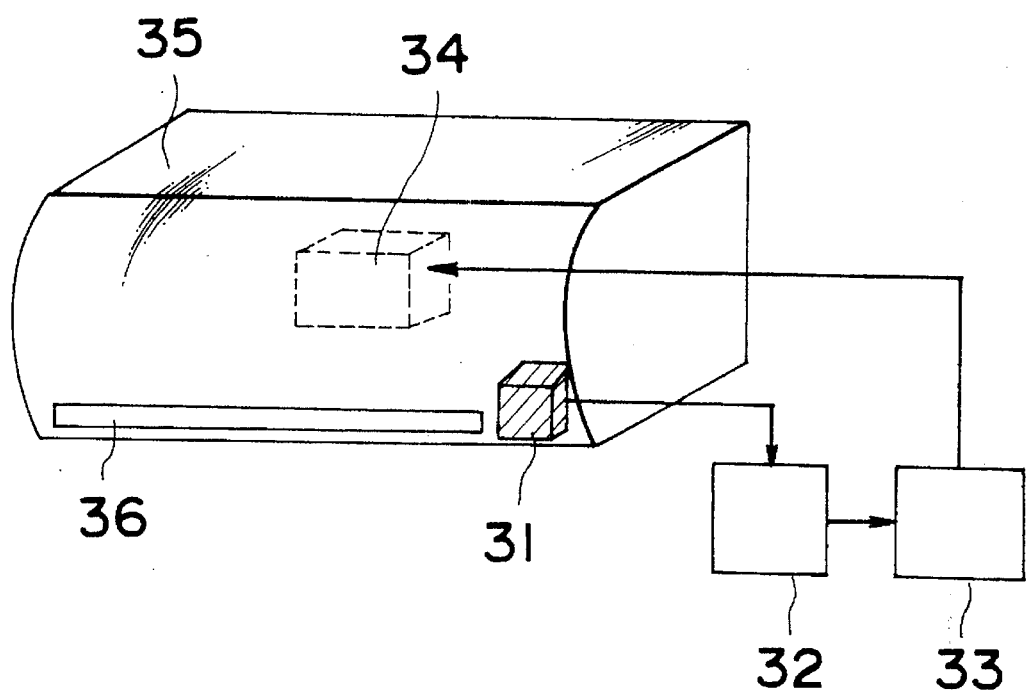
FIG. 3 is a schematic constitutional view of an air-conditioner according to the present invention.

FIG. 3 shows an arrangement of an air-conditioner using a non-contact temperature measuring device of the present embodiment.

Referring to FIG. 3, reference numeral 31 denotes a non-contact temperature measuring device of the present invention; 32 denotes a data forming unit for forming temperature data of individual ranges from signals generated by the non-contact temperature measuring device 31; 33 denotes a control signal forming unit for forming an air-conditioning control signal based on the data obtained from the data forming unit 32; 34 denotes an air-conditioning control unit for controlling air-blowing force, direction of wind, temperature of emission wind of an air-conditioner; 35 denotes a main body of the air-conditioner; and 36 denotes a blowoff port.

As described above, by using the non-contact temperature measuring device of the present embodiment in an air-conditioner, it becomes possible to realize an air-conditioner of a small size and low cost which can offer optimum air-conditioning depending on the measurement results of detecting the position of a human body and measuring temperatures of individual ranges in a room, without deteriorating degrading the system appearance.

Although the present invention has been fully described by way of example with reference to the accompanying drawings, it is to be noted here that various changes and modifications will be apparent to those skilled in the art. Therefore, unless such changes and modifications otherwise depart from the scope of the present invention as defined by the appended claims, they should be construed as included therein.

TABLE 1

| F = 1.4 f = 3.1 (mm) w = 35 (deg) n = 3.4177 | | | |
|---|---|---|---|
| | | d | 1.11 |
| $r_1$ | −17.7 | th | 2.2 |
| $r_2$ | −5.7 | bf | 3.37 |
| | | def | −0.45 |
| | | | (Unit: mm) |

TABLE 2

| F = 1.4 f = 3.1 (mm) w = 35 (deg) n = 3.4177 | | | |
|---|---|---|---|
| | | d | 1.03 |
| $r_1$ | −18.2 | th | 2.5 |
| $r_2$ | −5.8 | bf | 3.40 |
| | | def | −0.45 |
| | | | (Unit: mm) |

TABLE 3

| F = 1.4 f = 2.9 (mm) w = 37.5 (deg) n = 3.4177 | | | |
|---|---|---|---|
| | | d | 1.03 |
| $r_1$ | −14.6 | th | 2.0 |

TABLE 3-continued

| F = 1.4 f = 2.9 (mm) w = 37.5 (deg) n = 3.4177 | | | |
|---|---|---|---|
| | | d | 1.03 |
| $r_2$ | −5.2 | bf | 2.91 |
| | | def | −0.45 |
| | | | (Unit: mm) |

TABLE 4

| F = 1.4 f = 2.93 (mm) w = 37.5 (deg) n = 3.4177 | | | |
|---|---|---|---|
| | | d | 1.11 |
| $r_1$ | −21.8 | th | 2.85 |
| $r_2$ | −5.8 | bf | 3.20 |
| | | def | −0.45 |
| | | | (Unit: mm) |

What is claimed is:

1. A single lens system comprising a single infrared wide-angle meniscus lens having positive power and a first surface made concave facing toward an object plane and a second surface made convex, said single infrared wide-angle lens satisfying the following conditional expressions (1), (2), (3) and (4);

(1) $-50.0 \text{ th} < r_1 < -3.5 \text{ th}$ (2) $-5 \text{ th} < r_2 < -1.1 \text{ th}$ (3) $2 < n < 4.5$ (4) $0.1 \text{ f} < d < 0.8 \text{ f}$ where th is the lens thickness, $r_1$ is the radius of curvature of the first surface, $r_2$ is the radius of curvature of the second surface, n is the refractive index of a vitric material of the lens at a wavelength of 10 μm, an aperture stop is disposed between the object plane and the first surface, d is the distance between the aperture stop and the first surface, and f is the focal length of the lens.

2. The single lens system as claimed in claim 1, wherein the vitric material of the lens is silicon.

3. A single lens system comprising a single infrared wide-angle meniscus lens having positive power and a first surface made concave facing toward an object plane and a second surface made convex, said single infrared wide-angle lens satisfying the following conditional expressions (1), (2), (3) and (4);

(1) $-50.0 \text{ th} < r_1 < -3.5 \text{ th}$ (2) $-5 \text{ th} < r_2 < -1.1 \text{ th}$ (3) $2 < n < 4.5$ (4) $0.5 \text{ f} < bf < 1.5 \text{ f}$ where th is the lens thickness, $r_1$ is the radius of curvature of the first surface, $r_2$ is the radius of curvature of the second surface, n is the refractive index of a vitric material of the lens at a wavelength of 10 μm, bf is the backfocus and f is the focal length of the lens.

4. The single lens system as claimed in claim 3, wherein said single infrared wide-angle lens has a positive focal length.

5. The single lens system as claimed in claim 3, wherein the vitric material of the lens is silicon.

6. A single lens system comprising a single infrared wide-angle meniscus lens having positive power and a first surface made concave facing toward an object plane and a second surface made convex, said single infrared wide-angle lens satisfying the following conditional expressions (1), (2), (3) and (4);

(1) $-50.0 \text{ th} < r_1 < -3.5 \text{ th}$ (2) $-5 \text{ th} < r_2 < -1.1 \text{ th}$ (3) $2 < n < 4.5$ (4) $0.5 \text{ f} < \text{th} < 2 \text{f}$ where th is the lens thickness, $r_1$ is the radius of curvature of the first surface, $r_2$ is the radius of curvature of the second surface, n is the refractive index of a vitric material of the lens at a wavelength of 10 μm, th is the lens thickness and f is the focal length.

7. The single lens system as claimed in claim 6, wherein the vitric material of the lens is silicon.

8. A non-contact temperature measuring device comprising:

a measuring device body;

an infrared detector mounted to said measuring device body; and a single infrared wide-angle lens mounted to said measuring device body, said single infrared wide-angle lens comprising a single infrared wide-angle meniscus lens having positive power and a first surface made concave facing toward an object plane and a second surface made convex, said single infrared wide-angle lens satisfying the following conditional expressions (1), (2), (3) and (4);

(1) $-50.0 \text{ th} < r_1 < -3.5 \text{ th}$ (2) $-5 \text{ th} < r_2 < -1.1 \text{ th}$ (3) $2 < n < 4.5$ (4) $0.1 \text{ f} < d < 0.8 \text{ f}$ where th is the lens thickness, $r_1$ is the radius of curvature of the first surface, $r_2$ is the radius of curvature of the second surface, n is the refractive index of a vitric material of the lens at a wavelength of 10 μm, an aperture stop is disposed between the object plane and the first surface, d is the distance between the aperture stop and the first surface, and f is the focal length of the lens.

9. A non-contact temperature measuring device comprising:

a measuring device body;

an infrared detector mounted to said measuring device body; and a single infrared wide-angle lens mounted to said measuring device body, said single infrared wide-angle lens comprising a single infrared wide-angle meniscus lens having positive power and a first surface made concave facing toward an object plane and a second surface made convex, said single infrared wide-angle lens satisfying the following conditional expressions (1), (2), (3) and (4);

(1) $-50.0 \text{ th} < r_1 < -3.5 \text{ th}$ (2) $-5 \text{ th} < r_2 < -1.1 \text{ th}$ (3) $2 < n < 4.5$ (4) $0.5 \text{ f} < bf < 1.5 \text{ f}$ where th is the lens thickness, $r_1$ is the radius of curvature of the first surface, $r_2$ is the radius of curvature of the second surface, n is the refractive index of a vitric material of the lens at a wavelength of 10 μm, bf is the backfocus and f is the focal length of the lens.

10. The non-contact temperature measuring device as claimed in claim 9, wherein the single infrared wide-angle lens has a positive focal length.

11. A non-contact temperature measuring device comprising:

a measuring device body;

an infrared detector mounted to said measuring device body; and a single infrared wide-angle lens mounted to said measuring device body, said single infrared wide-angle lens comprising a single infrared wide-angle meniscus lens having positive power and a first surface made concave facing toward an object plane and a second surface made convex, said single infrared wide-angle lens satisfying the following conditional expressions (1), (2), (3) and (4);

(1) $-50.0 \text{ th} < r_1 < -3.5 \text{ th}$ (2) $-5 \text{ th} < r_2 < -1.1 \text{ th}$ (3) $2 < n < 4.5$ (4) $0.5 \text{ f} < \text{th} < 2\text{f}$ where th is the lens thickness, $r_1$ is the radius of curvature of the first surface, $r_2$ is the radius of curvature of the second surface, n is the refractive index of a vitric material of the lens at a wavelength of 10 μm, th is the lens thickness and f is the focal length.

12. An air-conditioner which comprises:

a non-contact temperature measuring device;

data forming means for forming temperature data of individual ranges based on a signal fed from said non-contact temperature measuring device;

control signal forming means for forming an air conditioning control signal based on the data obtained from said data forming means;

air-conditioning control means for controlling the air-conditioning based on the air-conditioning control signal obtained from said control signal forming means; and wherein said non-contact temperature measuring device comprises:

a measuring device body;

an infrared detector mounted to said measuring device body; and a single infrared wide-angle lens mounted to said measuring device body, said single infrared wide-angle lens comprising a single infrared wide-angle meniscus lens having positive power and a first surface made concave facing toward an object plane and a second surface made convex, said single infrared wide-angle lens satisfying the following conditional expressions (1), (2), and (3);

(1) $-50.0 \text{ th} < r_1 < -3.5 \text{ th}$ $-5 \text{ th} < r_2 < -1.1 \text{ th}$ (3) $2 < n < 4.5$ where th is the lens thickness, $r_1$ is the radius of curvature of the first surface, $r_2$ is the radius of curvature of the second surface, and n is the refractive index of a vitric material of the lens at a wavelength of 10 μm.

13. The air-conditioner as claimed in claim 12, wherein the single infrared wide-angle lens further satisfies the following conditional expression (4):

(4) $0.1 \text{ f} < d < 0.8 \text{ f}$ where an aperture stop is disposed between the object plane and the first surface, d is the distance between the aperture stop and the first surface, and f is the focal length of the lens.

14. The air-conditioner as claimed in claim 12, wherein the single infrared wide-angle lens further satisfies the following conditional expression (5):

(5) $0.5 \text{ f} < \text{bf} < 1.5 \text{ f}$ where bf is the backfocus and f is the focal length of the lens.

15. The air-conditioner as claimed in claim 12, wherein the single infrared wide-angle lens further satisfies the following conditional expression (6):

(6) $0.5 \text{ f} < \text{th} < 2\text{f}$ where th is the lens thickness and f is the focal length.

16. The air-conditioner as claimed in claim 12, wherein the single infrared wide-angle lens has a positive focal length.

* * * * *